Aug. 29, 1972  R. F. STAPLEY ET AL  3,687,688
METHOD OF MAKING POTATO PRODUCTS
Original Filed Dec. 14, 1966  5 Sheets-Sheet 2

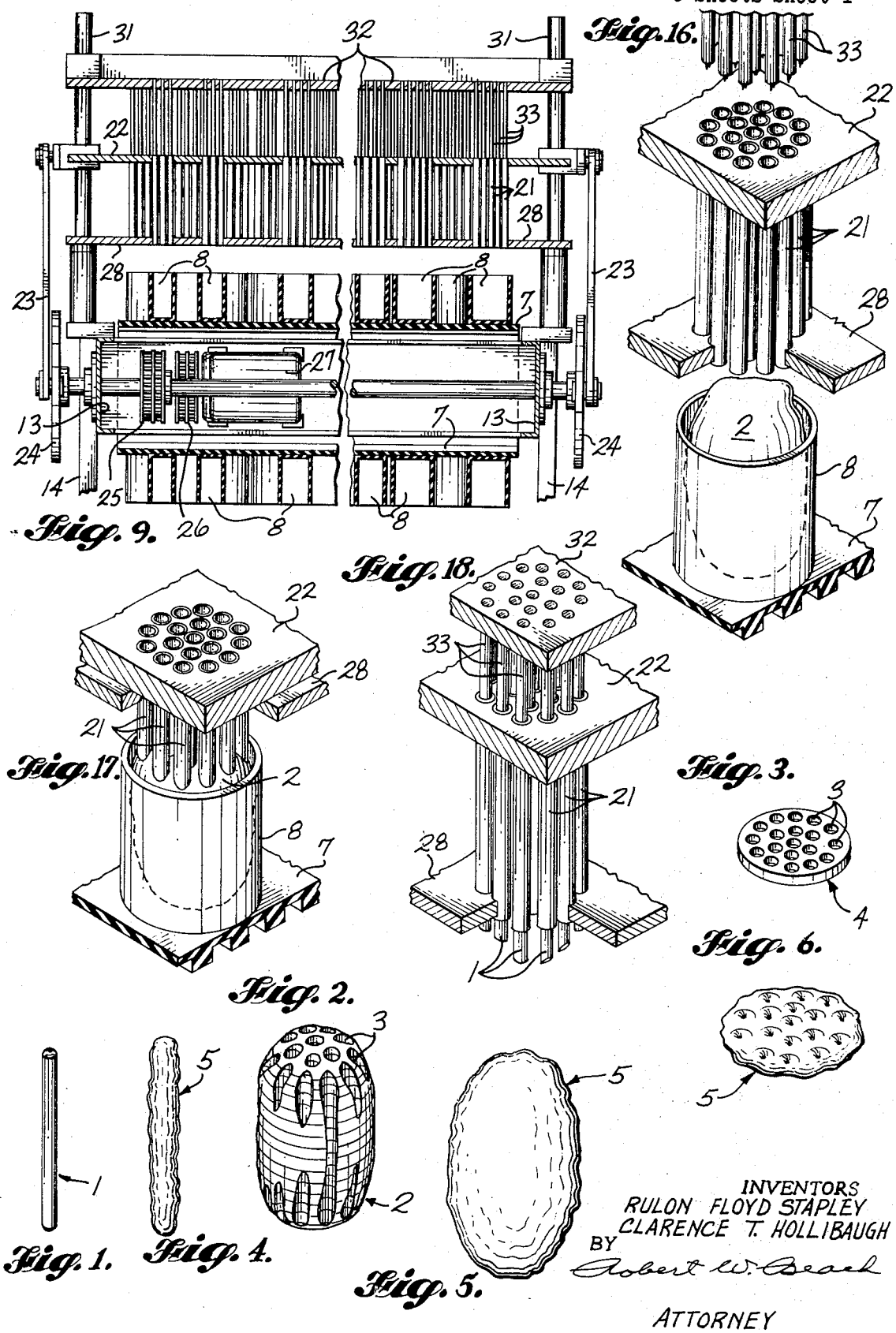

INVENTORS
RULON FLOYD STAPLEY
CLARENCE T. HOLLIBAUGH
BY
Robert W. Beach
ATTORNEYS

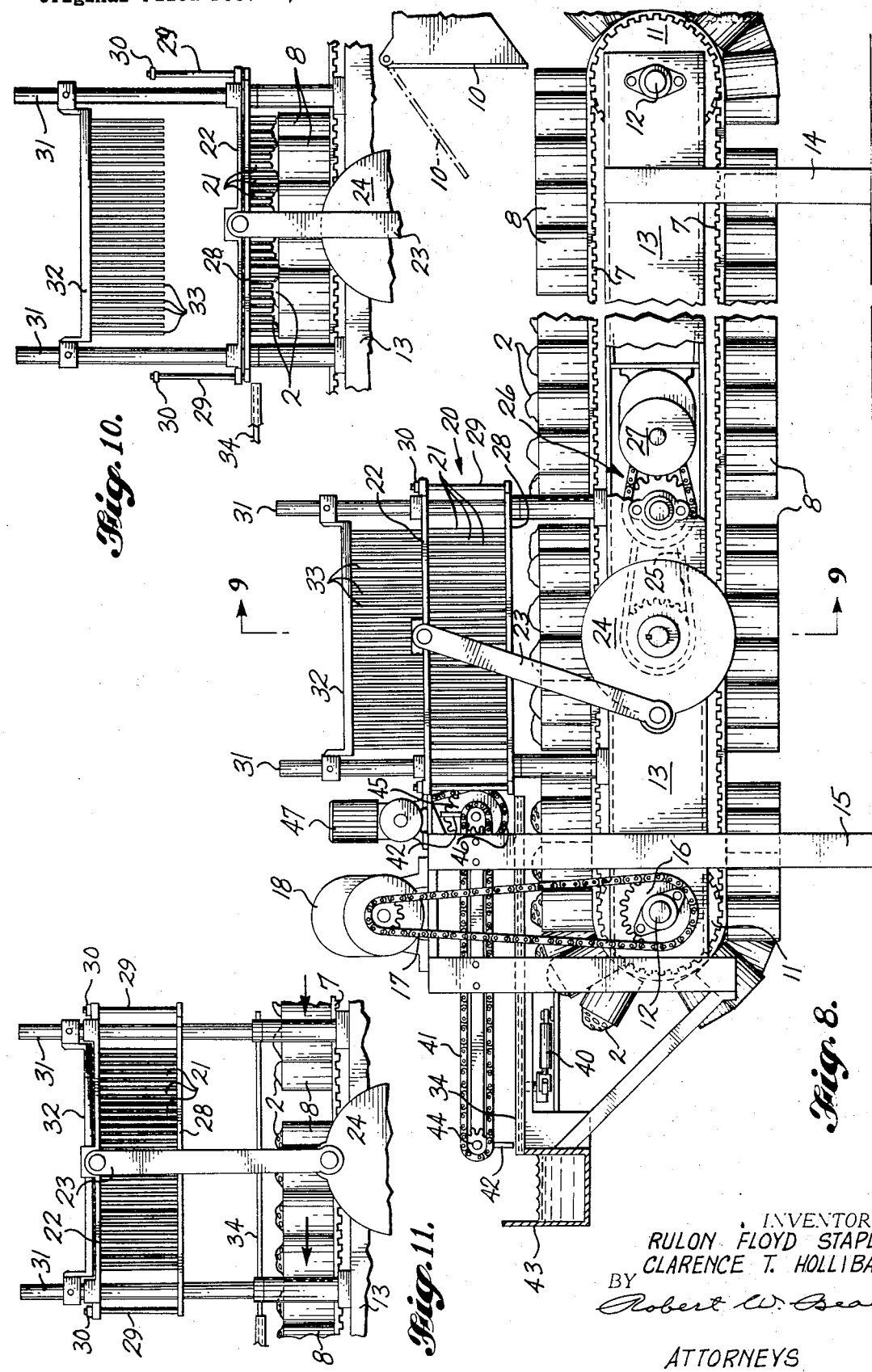

INVENTORS
RULON FLOYD STAPLEY
CLARENCE T. HOLLIBAUGH

ATTORNEY

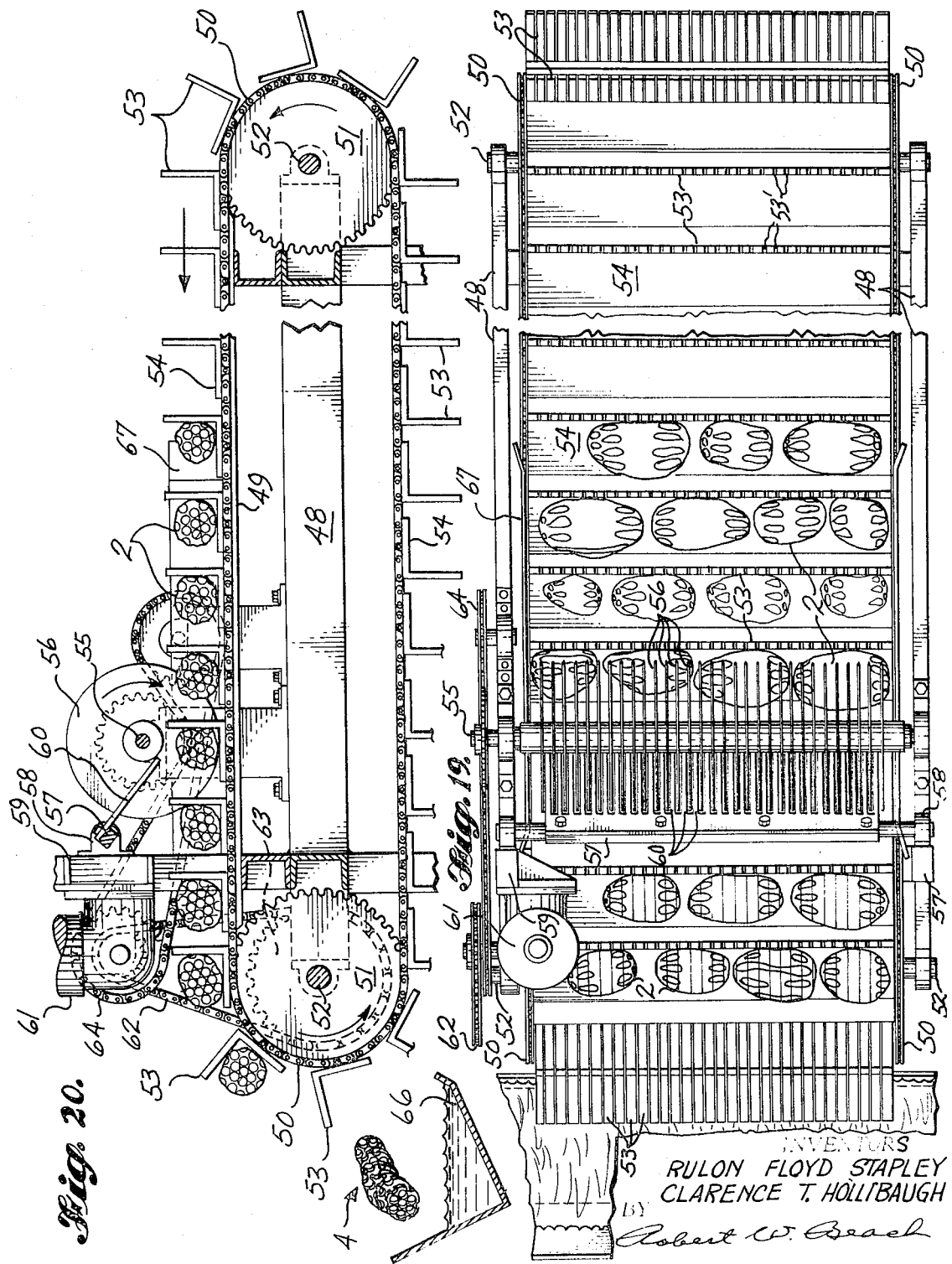

United States Patent Office 3,687,688
Patented Aug. 29, 1972

3,687,688
METHOD OF MAKING POTATO PRODUCTS
Rulon Floyd Stapley, 1255 Pine St., and Clarence T. Hollibaugh, 222 N. 13th St., both of Othello, Wash. 99344
Continuation of application Ser. No. 607,352, Dec. 14, 1966. This application Oct. 27, 1969, Ser. No. 869,964
Int. Cl. A23l 1/12
U.S. Cl. 99—100 P
9 Claims

ABSTRACT OF THE DISCLOSURE

Potatoes inserted endwise in cups are pierced lengthwise by a cluster of coring tubes which form cylindrical potato sticks. The resulting cored potato bodies are conveyed past rotating knife gangs which slice them into perforated slices. The potato sticks, potato slices and whole potatoes can be coated either before or after cooking and before freezing with batter containing sodium alginate which constitutes an agglutinant and a dehydration deterrent.

This application is a continuation of our application Ser. No. 607,352, filed Dec. 14, 1966, now abandoned.

A popular potato product is a potato stick which can be frozen and later heated or deep-fat fried. Conventionally such potato sticks have been cut with generally rectangular cross sections, customarily known as French fried potatoes when cooked. However, because of the irregular shape of potatoes, there is a considerable amount of waste or, conversely, a package of such potato sticks would contain a number of small slivers or chunks which require a different cooking time than the larger sticks. Consequently, such slivers should be removed from a supply of potato sticks before packaging or before cooking. If the slivers are cooked with the remaining contents of a package of potato sticks they will be overcooked.

It is a principal object of the present invention to provide a potato stick product of uniform cross section which would eliminate the necessity of sorting and which would result in all of the potato sticks being cooked uniformly in a given amount of cooking time. It is another important object to avoid wasting any portion of a whole potato by cutting such potato sticks from the potato in a manner such that the remaining potato body can be utilized as a further marketable potato product in the form of apertured slices. The apertures will promote uniform cooking.

A further object is to provide potato products to be frozen with a coating which will prevent dehydration of the potato during freezing and which will not flake off during handling or cooking of the product. It is a coincidental object to provide such a coating which will retain the moisture in the potato product even if reheated more than once while preventing absorption of additional moisture which would result in a soggy, unpalatable food.

An additional object is to provide apparatus for automatically coring whole potatoes to produce the potato sticks and further to automatically slice the cored potatoes to make the apertured potato slices.

It is another important object to provide such apparatus which will accommodate potatoes of all sizes throughout a wide range without sacrificing full potato utilization and uniformity of products.

It is also an object to minimize manual handling of the potatoes and potato products. Another object is to provide apparatus which is reliable in operation and which is easy to service and maintain.

The foregoing objects can be accomplished by cutting from a potato body a number of cylindrical potato sticks. The cylindrical bores left in the potato body will be spaced apart sufficiently so that the body will remain substantially rigid. Such potato body is then sliced transversely of the lengths of the cylindrical bores to provide perforated potato disks. Potato sticks and perforated disks or a whole potato can be immersed in a batter containing sodium alginate to provide a coating on such potato products which will adhere to the product and prevent escape of moisture from or access of moisture to it.

The potato sticks can be cut from a potato body supported in a cup. A plurality of such cups can be mounted on a conveyor which transports such cups to a coring station. The conveyor then stops and multiple coring tubes are pressed through each potato and then withdrawn, carrying the potato sticks in the tubes. As the tubes continue to move away from the potato-carrying cups, ejection rods extend into such tubes and push the sticks out of the tubes onto a receiving plate which is reciprocable from a position underlying the coring tubes to a position whereby the coring tubes can again move downward past such plate. The potato sticks are then scraped from the receiving plate into a flume and transported to a coating, freezing, or storage station. The cup-bearing conveyor is advanced to deliver another group of potatoes to the coring station and the cycle is repeated. As the conveyor advances and the cups containing the cored potato bodies are carried around the conveyor end sprockets, the potato bodies are dropped from the cups into a bin or onto a further conveyor for transport to the slicing apparatus.

The slicing apparatus includes a bucket conveyor for receiving the cored potato bodies and transporting them through a bang of parallel slicing disks for slicing the potato bodies transversely of the length of the bores. The teeth of a stripper comb are interdigitated between the slicing disks to prevent the slices from riding up between the disks. The conveyor then deposits the sliced potato bodies into a flume for transport to a coating, freezing, or storage station.

FIG. 1 is a top perspective of a potato stick produced by the method and apparatus of the present invention. FIG. 2 is a top perspective of a multiapertured potato body from which such sticks have been removed and FIG. 3 is a top perspective of a multiapertured potato disk sliced from the body of FIG. 2.

FIGS. 4 and 5 are elevations of a potato stick and a whole potato, respectively, and FIG. 6 is a top perspective of a perforated potato disk which has been coated with batter according to the present invention.

FIG. 8 is a side elevation of such coring apparatus and FIG. 9 is a section through such apparatus on line 9—9 of FIG. 8.

FIGS. 10 and 11 are fragmentary side elevations of the coring apparatus showing parts in different operative positions.

FIGS. 16, 17 and 18 are detail perspectives of the coring components in sequential relative positions.

FIG. 19 is a plan of slicing apparatus for producing perforated potato slices such as shown in FIG. 3, and FIG. 20 is a side elevation of such slicing apparatus.

Figure 7:
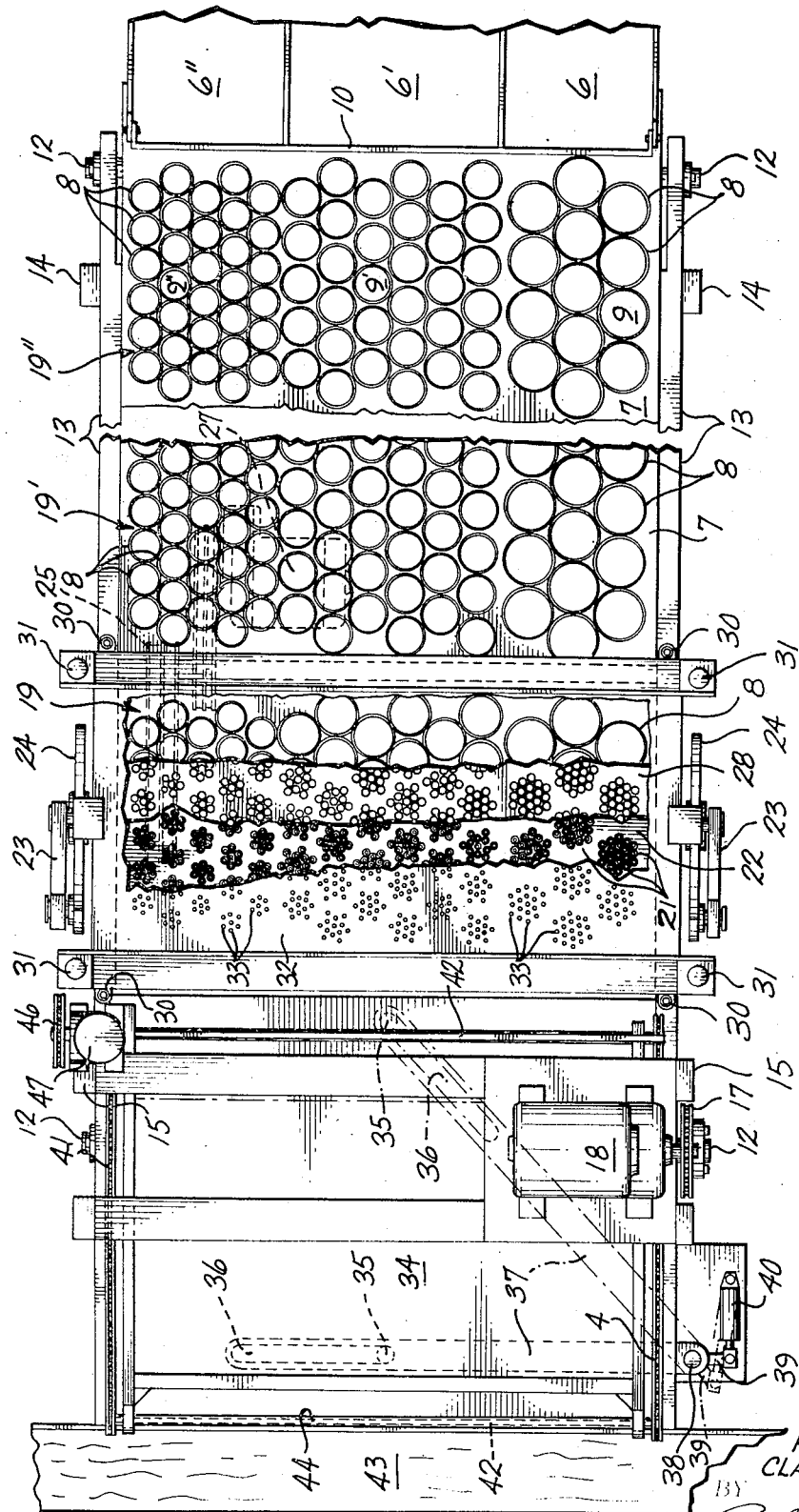
FIG. 7 is a plan of coring apparatus for producing potato sticks and cored potato bodies such as shown in FIGS. 1 and 2, respectively, having parts broken away.

Multiple cores are cut from a peeled potato to form cylindrical potato sticks 1, shown in FIG. 1, and a cored potato body 2, shown in FIG. 2. The body 2 is then sliced transversely of the length of the bores 3 from which the sticks 1 have been removed to form multiperforated disks 4 shown in FIG. 3, so as to provide a very large surface area for contact of grease during deep fat frying and for escape of moisture.

The potato products are washed and the sticks, disks, or whole potatoes may be coated with batter 5 as shown in FIGS. 4, 5 and 6, respectively. An important ingredient of such batter is a suitable alginate, preferably sodium alginate. This constituent causes the batter to form a coating which will adhere to the potato product sufficiently persistently that it will not flake off during freezing or when the products are cooked or deep-fat fried. The batter is preferably made with the following ingredients and in the relative proportions indicated:

4 fresh eggs or ⅔ cup powdered egg
3 cups milk
2 cups flour
3 tsp. baking powder
2 tsp. salt
2 tsp. shortening or cooking oil
1 tsp. sodium alginate The batter may be thinned slightly with milk for coating the perforated slices 4 so that the batter will flow into the holes or apertures 3 without completely bridging across them, as shown in FIG. 6. With the exception of the sodium alginate, the batter ingredients are conventional. It has been found that the added sodium alginate causes the batter to form a continuous coating which adheres to the potato product so persistently that it does not fall away from a potato stick, for example, in flakes during transportation or when the sticks are dumped from a package into a cooking pan. The coating prevents dehydration of the potato and prevents access of outside moisture to such potato. The coating adheres to potato products when such products are deep-fat fried before freezing so that the product can be reconstituted ready to eat only by being heated before serving or, conversely, when the products are frozen and later deep-fat fried by the consumer.

The apparatus for coring a potato to form the cylindrical sticks 1 is shown in FIGS. 7 through 18. Peeled potatoes are sorted by conventional sorting apparatus into bins or chutes 6, 6', and 6'' for large, medium, and small potatoes, respectively. Conveyor belt 7 carries cups 8 arranged in groups forming rows extending transversely of the belt length, the cups of which groups have interiors 9, 9', and 9'', respectively, of different sizes proportioned to accommodate the sorted potatoes, as shown best in FIG. 7. When a gate 10 shown in FIG. 8 is raised, potatoes from the bins drop onto the cups. It is preferable to have one or two operators alongside the conveyor to orient the potatoes manually in the cups so that their lengths are upright.

The conveyor belt 7 is preferably made of relatively thick rubber having transverse ribs on its side opposite cups 8 to mesh with the teeth of sprockets 11 and to strengthen the belt. Each sprocket may have an axial extent to support the width of the belt or a bed may be provided to underlie and support the belt. The sprockets are carried on shafts 12 journaled in bearings mounted on frame channels 13 supported on legs 14 and 15. As shown in FIG. 8, one shaft 12 carries a drive sprocket 16 which is driven through chain 17 by motor 18. It is preferred that the cups 8 be attached to belt 7 only at their central portions, such as by bolts and nuts, or by rivets, to facilitate movement of such cups around the end sprockets 11.

As seen best in FIG. 7, each row 19, 19', and 19'' in which the cups are arranged in groups is of an extent lengthwise of the belt to correspond to the area of a coring station 20. The arrangement of the cups in each group of each row is identical to the arrangement of the cups in the corresponding groups of every other row. When the row 19 of cup groups is positioned in the coring station, belt 7 is stopped. Clusters of coring tubes 21 depend from a mounting plate 22. Preferably such tubes are all of the same size but each cluster is of a size and location to fit a potato-holding cup. The clusters to fit into the cups with small interiors 9 may have only seven tubes, as shown, while the clusters to fit into the cups with medium-sized interiors 9' may have thirteen tubes and the clusters to fit into the large cups 9'' may have nineteen tubes. The tubes 21 and tube-mounting plate 22 are driven for vertical reciprocation by a pair of crank arms 23 pinned to crank disks 24 at the opposite sides of the belt 7. Each crank disk is driven through a chain 25 and speed reducer 26 by motor 27.

The lower ends of the coring tubes extend through a stripping plate 28 perforated corresponding to the arrangement of the coring tubes. Guide posts 29 are mounted on the stripping plate and extend upward through ears on the tube-mounting plate 22. The ears of such tube-mounting plate slide downward along the posts as the plate moves from the position of FIG. 8 into the position of FIG. 10 as the stripping plate 28 rests stationarily in its lowermost position on shoulders on main posts 31.

Both the coring tube-mounting plate 22 and stripping plate 28 are slidably guided by main posts 31. When the mounting plate 22 again is lifted by the crank arms 23 from the lowered coring position of FIG. 10 to the position of FIG. 8, the ears engage heads 30 of the guide posts 29 to raise the stripping plate as the tube-mounting plate continues to move toward its upper position shown in FIG. 11. The spacing between such heads and the coring plates is small enough to prevent the tubes 21 from being pulled out of the apertures in the stripping plate before it is thus lifted conjointly with the tube-mounting plate 22. The heads 30 may be removable to enable the coring apparatus to be taken apart when desired. A plate 32 is anchored stationarily to the upper portions of the main posts 31 above tube-mounting plate 22. Potato stick-ejecting fingers 33 depend from such stationary plate in an arrangement to enter the upper ends of the coring tubes as the tubes move toward the upper position shown in FIG. 11 to eject the potato sticks from such tubes.

A receiving plate 34 is reciprocable from a position forward of the coring station to a position underlying the coring tubes. As shown in FIGS. 7 and 8, the plate 34 carries a pin 35 near its forward end, which is received in a longitudinal slot 36 near the swinging end of a cantilever arm 37 pivotally mounted by a pin 38. A lug 39 projecting from the pivoted end of the arm 37 is pinned to the free end of the piston rod of jack 40. When the piston rod is in its retracted position, arm 37 is disposed transversely of the conveyor belt 7 as shown in broken lines in FIG. 7 and plate 34 is in its forward position. When the piston rod is extended, the arm is swung clockwise about pivot pin 38 into the dot-dash line position of FIG. 7 to move plate 34 rearwardly into the coring station.

Figure 12:
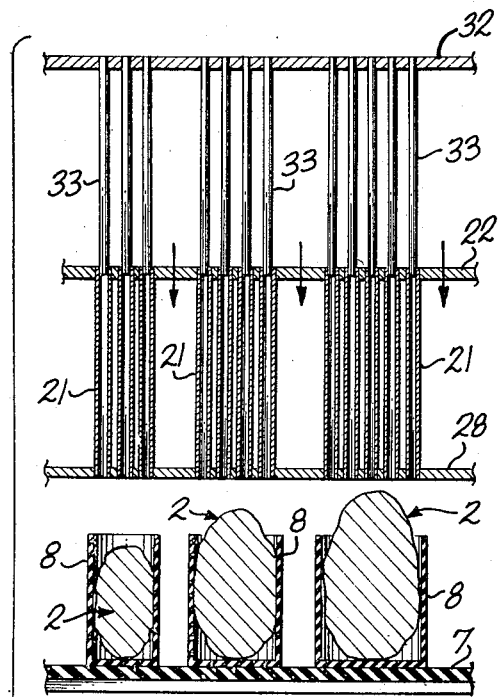
FIGS. 12, 13, 14 and 15 are fragmentary diagrammatic vertical sections showing various components in sequential positions.
Figure 13:
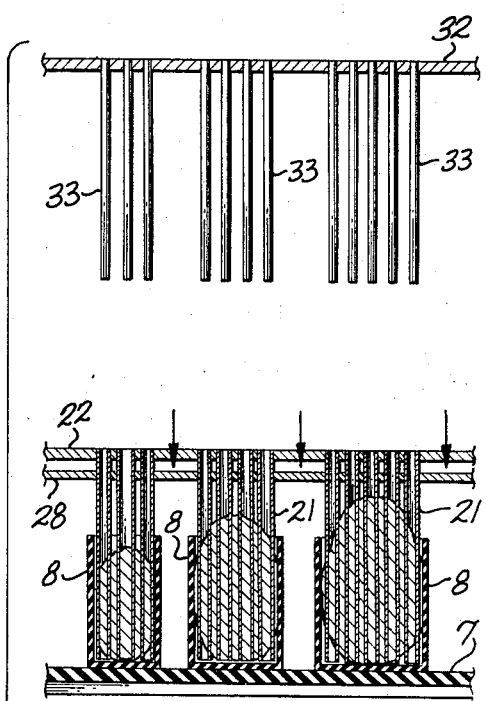

When a group 19 of cups is in the coring station and the belt 7 has stopped, tube-mounting plate 22 carrying coring tubes 23 is moved downward from the position shown in FIG. 12, as indicated by the arrows, into the position of FIGS. 10 and 13 to press the coring tubes through the potatoes in cups 8 lengthwise of the potatoes. The lower edges of the coring tubes may be sharpened and cups 8 and belt 7 are preferably made of rubber or similar resilient material to cushion the impact as the coring tubes extend through the bottoms of the potatoes and onto the cup bottoms. The resilience of the cup bottom and the belt will also prevent dulling of the sharpened tube edges.

Figure 14:
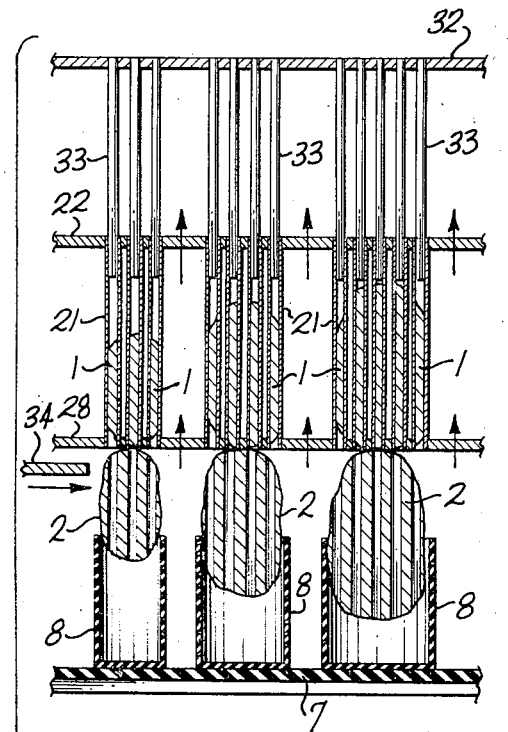

As the crank arms 23 move upward from the positions of FIG. 10 toward the positions of FIG. 11, the coring tubes 21 are moved upward from the positions of FIG. 13 to the positions of FIG. 14 as indicated by the arrows in FIG. 14. As the coring tubes are raised, the potato bodies may cling to the tubes and tend to be carried upward with them. Stripping plate 28, however, will be engaged by the top of the potato bodies 2 and as the tubes are further raised they will be withdrawn from the bodies and such bodies will drop back into their respective cups.

Figure 15:
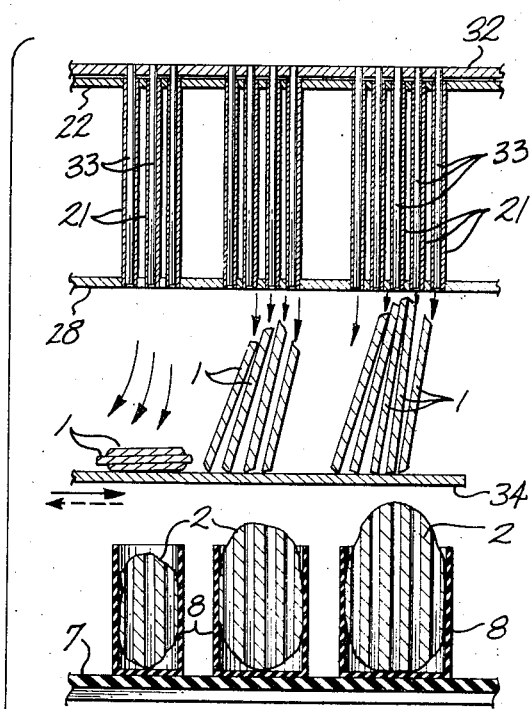

When the stripping plate 28 has been raised by the tube-mounting plate 22 moving from the position of FIG. 14 toward the position of FIG. 15 far enough to clear the path of movement of receiving plate 34, jack 40 will be extended to swing arm 37 for moving such plate into underlying registry with the coring tubes, as indicated by the full-line arrow in FIG. 15. As the coring tubes continue their upward movement toward their upper positions of FIG. 15 ejecting rods 33, which have entered the upper end of the tubes as shown in FIG. 14, will push potato sticks 1 carried in tubes 21 out of the tubes and such sticks will drop onto the receiving plate. The supply of pressure fluid to jack 40 will then be reversed to move plate 34 and the potato sticks carried on it out of the coring station.

One type of mechanism for removing the potato sticks from the receiving plate 34 includes a pair of continuous chains 41 mounted above the receiving plate forward of the coring station, one alongside each edge of the conveyor 7 and receiving plate, with their lower stretches extending parallel to such conveyor and plate as shown in FIGS. 7 and 8. At least one scraping vane 42 bridges between and projects downward from these chains to scrape potato sticks from the the plate into flume 43. Preferably two such vanes are carried by opposite portions of the chain loops. The chains are carried by sprockets on shafts 44. On one of these shafts is a drive sprocket 45 connected through chain 46 to motor 47 for driving the chains and the scraping vanes carried by them.

Alternatively the coring station may be located closer to the discharge end of conveyor 7 and flume 43 could be located closer to the coring station. A scraping vane depending from a pair of jacks at its opposite ends could then be interposed between the forward end of the coring station and the aft end of the receiving plate when such plate is in its forward position. The vane would normally be in a raised position with its lower edge elevated sufficiently to permit the receiving plate to move from its aft position in the coring station to its forward position without such vane engaging any potato sticks carried on such plate. At the same time that jack 40 is extended to move receiving plate 34 from its forward to its aft position, the jacks supporting the scraping vane are extended to lower the vane to a position closely adjacent to the upper aft edge of the plate to scrape potato sticks deposition on the plate from the previous coring operation into flume 43 as the plate moves rearward beneath the vane. When jack 40 is retracted to move the receiving plate forward again, the scraping vane jacks are retracted to raise the vane to its normally elevated position.

As shown in FIG. 7 and previously described, the potato-holding cups 8 are arranged in rows of groups along the length of conveyor 7, as indicated at 19, 19', and 19''. A lug may project from the conveyor 7 immediately forward of each row of cup groups to engage a switch to deenergize motor 18 to stop forward travel of the conveyor and simultaneously to energize motor 27 to begin operation of the crank 24 to effect the coring operation. By such location of the lug and switch, the conveyor will stop with a row of potato-holding cup groups, such as 19, at the coring station in registry with the clusters of coring tubes.

When the crank motor is energized, the crank disks 24 will rotate in a counterclockwise direction as seen in FIG. 11 from the position shown in that figure, through the position of FIG. 8, to the lowermost position of the crank arm, as shown in FIG. 10, forcing the coring tubes downward to core the potatoes in the cups. As the crank continues its revolution through 180 degrees from the position of FIG. 8, the coring tubes will be moved upward to the position shown in that figure and FIG. 14, being withdrawn from the cored potatoes. A lug on the tube-mounting plate 22 will then engage a switch to extend jack 40 to move the reciprocating potato stick-receiving plate 34 into a position underlying the stripping plate 28. A time-delay relay will cause the receiving plate to dwell under the coring tubes until such tubes have reached the uppermost position of FIG. 15 and the jack will then be retracted to return plate 34 to its initial position. As the crank arm 23 moves the coring tube-mounting plate 22 into its uppermost position, such plate will engage a switch to deenergize the crank motor.

When the potato-receiving plate 34 returns to its initial position, as shown in FIG. 8, it actuates a switch to energize motor 47 to drive chains 41 and the scraper vanes carried by them. When the chains have travelled a distance equal to one-half their length to scrape the potato sticks into flume 43, a lug on one of the chains contacts a limit switch to deenergize motor 47. The conveyor motor 18 could be energized simultaneously with deenergization of crank motor 27 or with energization of motor 47 to move conveyor 7 through another increment to shift the next row of cup groups 19' into the coring station.

In FIGS. 19 and 20 apparatus for slicing the cored potato bodies 2 is shown. A frame 48 carries a bed 49 over which runs a conveyor including buckets mounted between spaced chains 50. These chains are mounted on sprockets 51 carried by shafts 52, which shafts are journaled in frame 48. The bed 49 is inclined upwardly in the direction of travel of the upper stretches of chains 50 indicated by the arrow in the upper right portion of FIG. 20. The conveyor buckets are in the form of angles carried by the chains 50 and extend transversely of their direction of travel to provide pockets, each having a slotted upright flange 53 and a chain-engaging flange 54. The buckets are of a length transversely of the chain lengths sufficient to receive several apertured or cored potato bodies 2 arranged with their lengths and the lengths of their apertures parallel to the lengths of the pockets. The upward inclination of bed 49, chains 50 and chain-engaging flanges 54 will cause bodies 2 to be rolled by gravity against the upright flanges 53 so that the potato bodies will be retained in the buckets without additional holding means.

Near the discharge end of the conveyor, a shaft 55 extends transversely of the direction of conveyor movement and is located above the chains 50 a distance slightly greater than the height of the upright bucket flanges 53. A plurality of cutting disks 56 are carried in parallel spaced relationship on shaft 55. The disks extend radially sufficiently to span from shaft 55 to a location closely adjacent to, but out of contact with, the chain-engaging bucket flanges 54. Slots 53' in upright flanges 53 are spaced along the lengths of the flanges corresponding to the spacing of disks 56 to permit passage between the disks of the portions of the upright flanges between the slots.

A stripping comb 57 is mounted on a shaft 58 journaled between posts 59 supported on frame 48. The shaft 58 is located at an elevation higher than that of the cutting disk shaft 55. The teeth 60 of comb 57 extend from shaft 58 downward to form a tangent to shaft 50. A post 59 may also support a motor 61 which drives conveyor chains 50 through chain 62 and sprocket 63 on shaft 52 carrying one pair of conveyor chain sprockets 51. Motor 61 also drives cutting disk shaft 55 through a chain 64.

When apertured or cored potato bodies 2 are placed on bucket flanges 54 of conveyor 50 with their lengths extending transversely of the direction of conveyor travel, indicated by the arrow in FIG. 20, such conveyor carries the potato bodies toward cutting disks 56. The cutting disks rotate in a clockwise direction, as shown in FIG. 20, so that the portions of the disks nearer the aproaching conveyor buckets move downward as they first engage a potato body 2 so that the disk force on the potato body will have a component perpendicular to bucket flange 54 to hold the potato body in its pocket.

When the bucket has advanced to a position in which the disk cutting edges are tangential to the flange 54, slicing of the body 2 will have been completed and there will no longer be a downward force on the potato body.

However, the upright flange 53 of the bucket will tend to push the potato slices 4 forward toward the discharge end of the conveyor. If individual slices should be carried upward out of a conveyor bucket by pairs of adjacent disks, stripping comb teeth 60 will be engaged by such slices to prevent their further upward movement and urge them out from between the disks and forwardly back into their buckets.

The potato slices are carried forward by the conveyor buckets and, as the conveyor chains continue around end sprockets 51, the slices are dropped into flume 66 by which they are transported to coating, freezing or storing stations. It is preferred that the buckets be mounted on chains 50 at a location centrally of the width of chain-engaging flanges 54 to facilitate movement of the buckets around the conveyor end sprockets. Upright guide plates 67 may be provided at each side of the conveyor to prevent potato bodies 2 from sliding endwise from the conveyor pockets and will prevent slices 4 on the outer sides of the end cutting disks from falling out of the ends of the pockets.

We claim:

1. The method of making edible potato products which comprises coring a potato at closely-spaced locations and thereby forming and removing from the potato a plurality of potato sticks having uniform cross sections, and leaving a multiapertured body.

2. The method of making edible potato products defined in claim 1, in which the coring is lengthwise of the potato.

3. The method of making edible potato products defined in claim 1, and coating the potato sticks with batter containing an alginate.

4. The method of making edible potato products defined in claim 3, in which the alginate is sodium alginate.

5. The method of making edible potato products defined in claim 1, in which the potato sticks are cylindrical.

6. The method of making edible potato products defined in claim 1, and cutting the multiapertured body transversely of the lengths of the apertures and thereby forming multiperforated slices.

7. The method of making edible potato products defined in claim 6, and coating the multiperforated slices with batter containing an alginate.

8. The method of making edible potato products defined in claim 7, in which the alginate is sodium alginate.

9. The method of making edible potato products which comprises holding a peeled potato with its length upright, moving the potato into underlying registry with upright coring tubes, arresting movement of the potato in such position, sequentially moving the coring tubes downward to penetrate the potato and form potato sticks and moving the coring tubes upward to withdraw the coring tubes from the potato, placing a potato stick-receiving plate under the coring tubes, while continuing to move the coring tubes upward ejecting potato sticks from the coring tubes onto the receiving plate, withdrawing the receiving plate out of underlying registry with the coring tubes, holding and moving another potato into underlying registry with the coring tubes, and repeating the sequence of operations.

References Cited

UNITED STATES PATENTS

| | | | |
|---|---|---|---|
| 3,235,385 | 2/1966 | Cull | 99—1 |
| 3,078,172 | 2/1963 | Libby | 99—192 |
| 2,612,453 | 9/1952 | Stahmer | 99—100 |

RAYMOND N. JONES, Primary Examiner

W. A. SIMONS, Assistant Examiner

U.S. Cl. X.R.

146—52, 78